United States Patent [19]

Anderson et al.

[11] Patent Number: 5,623,122

[45] Date of Patent: Apr. 22, 1997

[54] METHOD AND APPARATUS FOR SERVICE CABLE DISCONNECTION

[75] Inventors: Donald W. Anderson, 1857 Hayes Leonard Rd., Valparasio, Ind. 46383; David A. Chlebek, LaPorte, Ind.

[73] Assignee: Donald W. Anderson, Valparaiso, Ind.

[21] Appl. No.: 269,829

[22] Filed: Jul. 1, 1994

[51] Int. Cl.⁶ ........................................... H02G 7/04
[52] U.S. Cl. .................. 174/40 TD; 174/45 TD; 439/474; 403/2
[58] Field of Search .................. 174/40 R, 40 TD, 174/44, 45 R, 45 TD; 439/474, 475, 923; 403/2

[56] References Cited

U.S. PATENT DOCUMENTS

| | | | |
|---|---|---|---|
| 3,761,865 | 9/1973 | Bomgaars et al. | 174/40 R |
| 4,698,717 | 10/1987 | Scheid | 361/1 |
| 5,315,064 | 5/1994 | Andrews | 174/40 TD |

*Primary Examiner*—Kristine L. Kincaid
*Assistant Examiner*—Paramita Ghosh
*Attorney, Agent, or Firm*—Ryan M. Fountain

[57] ABSTRACT

A breakaway connection device is provided which is particularly suited for use with residential electric service cables. This device is mounted between the service cable and the service pole and serves to disconnect the cable from the pole upon the application of a predetermined level of tension or force to the cable. That level of force is selected so that the service cable breaks away from the pole and de-energizes the conductive wires before the service cable would pull away from and damage the dwelling. This device includes an insulated sheath having therein two hollow wire receiving elements which are separably joined by a conductive insert, formed as a solid rod or threaded member.

3 Claims, 1 Drawing Sheet

METHOD AND APPARATUS FOR SERVICE CABLE DISCONNECTION

BACKGROUND AND SUMMARY OF THE INVENTION

The present invention relates generally to installation of electric power cables and, more particularly, to methods and apparatus for installing overhead electric cables to a residential dwelling.

Electric power is often provided to residential dwellings by way of an overhead service cable connected between the dwelling and a service pole. Such service cables are typically comprised of a plurality of insulated wires wrapped around and supported by a bare base wire or cable. At the service pole, the base wire is often secured to an insulated spool mounted on a clevis extending from the upper portion of the pole. The insulated wires are, for example, connected to power carrying or "energized" wires in the pole, but since the weight of the service cable is carried by the base wire, the insulated wires are not under any substantial tension during normal connection.

The service cable is normally connected to the dwelling by one of two methods: an insulated anchor nob attached to a steel riser pipe or attached directly to the house. In either case, the base wire is secured to the nob and normally supports the weight of the service cable. Even where the base wire is not attached to the riser pipe, the insulated wires are frequently run through the riser pipe from the weatherhead down into the meter base for electrical connection with the internal residential wiring.

While such arrangements have been generally satisfactory, certain problems have arisen when the service cable has been subject to damage from high winds directly and/or impact with falling tree limbs and other obstructions. For example, when excessive tension is placed on the service cable, the house anchor nob can be pulled away from the house regardless of whether it is screwed into the house directly or attached to the riser pipe. In the latter case, the riser pipe can be pulled away as well. As a result, the roof, facia, and/or siding of the house as well as the meter base can be damaged. Since the utility company providing the electric service often disclaims responsibility for accidents past the weatherhead and this damage occurs directly "downstream" of the weatherhead, the repair expenses are frequently borne by the customer or owner of the residence.

Moreover, if the damage is extensive and a hazard exists due to the proximity of the insulated, current carrying or energized wires to areas where people and animals could come into contact with those wires, the utility company will typically shut off electric service until the customer has the repairs made. As a result of this sometimes extended service outage, the customer will typically incur secondary expenses incident to defrosted refrigerators and freezers (food spoilage) and/or sump pump failure (flooded basements and lower building levels).

Additionally, where the service cable has been subject to sufficient force to completely sever the connection to the house, the energized wires which have broken off from the house may present a fire and electrocution hazard on the ground if, as is often the case, there is still an electrical connection to the service pole wiring. When, for example, this occurs as a result of a nighttime storm, the hazard may not be quickly or easily detected. Thus, customers, passersby and utility repair persons may be placed in serious risk of injury.

Accordingly, it is an object of the present invention to provide an improved method and apparatus for connecting electric service cables to residential dwellings and other structures having like service connection formats. Other objects include the provision of:

A. an apparatus which minimizes the repair time and expenses associated with service cable disconnection, B. an apparatus which reduces the risk of injury incident to disconnected electric cables, C. an apparatus which permits reduced power outage time in the event of a service cable disconnection, D. a service cable connection arrangement which does not damage the dwelling to which it is attached when the cable is subject to excess tension, and E. a service cable connection arrangement which de-energizes when the cable is subject to excess tension.

These and other objects of the present invention are obtained by the provision of a breakaway connection arrangement for electric power lines having two retaining elements, each receiving an end of an electrically conductive wire for crimpable connection therewith, and being separably joined by a conductive element within an insulated housing or sheath. This type of connection is used at least at the service pole end of the service cable such that when a predetermined level of force or tension is applied to the service cable, the cable separates from the pole and the conductive wires are de-energized. The predetermined level of separation force is selected such that the service cable separates from the pole under less tension than would be required to pull the anchor nob and/or riser pipe from the house. This is accomplished by selection of the separation force needed to cause the conductive element to pull apart from one or both of the retaining elements. That selection is, for example, made by the choice of the crimping force applied to the initial assembly of the conductive element into the retaining elements.

Other objects, advantages and novel features of the present invention will now become readily apparent to those skilled in the art upon consideration of the drawings and detailed description below.

DETAILED DESCRIPTION OF PREFERRED EMBODIMENTS

Figure 1:
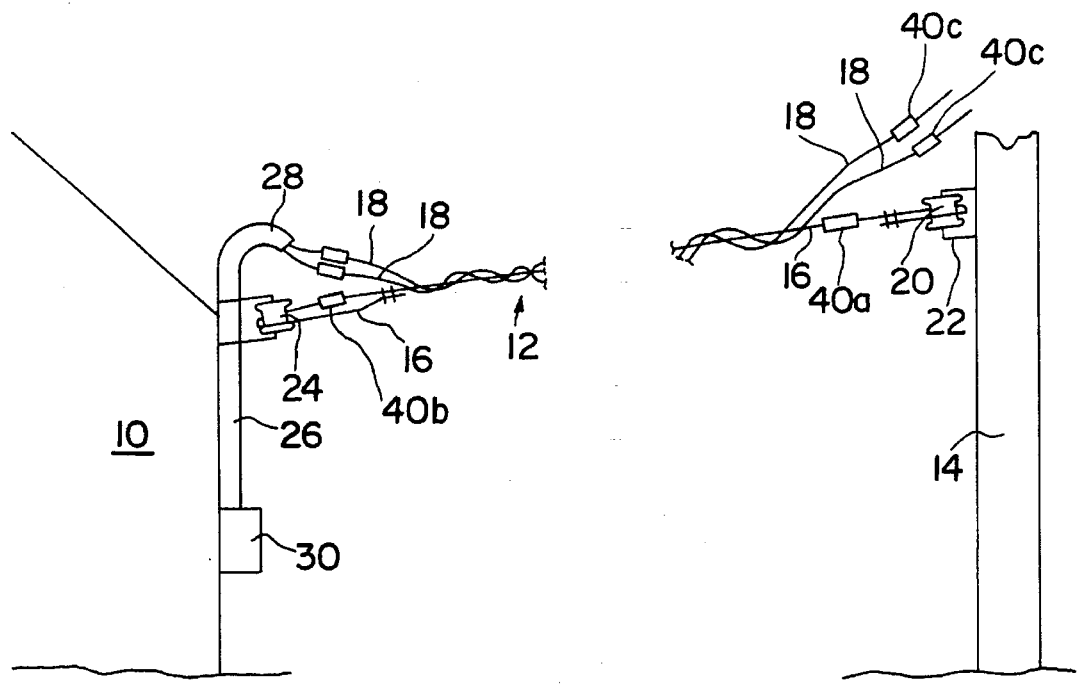
FIG. 1 shows a plan view of a typical breakaway service cable connection arrangement, especially for a residential structure, employing the principles of the present invention.

FIG. 1, which illustrates a preferred embodiment of the present invention, shows a structure 10, such as a residential building, having a service cable 12 for electric power attached from a service pole 14. As is often the case, in order to minimize the risk of damage to the service cable and persons and/or animals in the vicinity, the service cable connection is made between elevated portions of both the pole and the building. The service cable is, for example, composed of multiple strands of wire, at least one of which is the base or load supporting wire or cable 16. The other wires that make up the service cable include the insulated, electrically conducting wires 18 which are energized to carry electric power from pole 14 (or any other structure serving that purpose) to structure 10.

Service cable 12 is connected to pole 14 via an insulated spool 20 which is mounted on a clevis 22 attached to the pole. One end of base wire 16 is, for example, wrapped around spool 20 and secured back on itself in a conventional manner. The other end of base wire 16 is similarly wrapped around an insulated anchor nob 24 which is, for example, screwed into structure 10 or attached to riser pipe 26. This attachment of the base wire between the two structures 10 and 14 is adapted to support the entire normal load of the service cable. At structure 10 the conducting wires are typically run through a weatherhead 28 of riser pipe 24 and are connected to meter base 30, which serves as the junction for the internal electrical wiring of structure 10. In such an arrangement, conducting wires 18 are under minimal tension.

In order to protect against problems that would otherwise arise if excess tension or force is applied to service cable 12, breakaway connection devices 40 are preferably included at several locations in the service cable connection arrangement. Specifically, device 40a is shown as attached to base wire 16 immediately below the connection with spool 20. Device 40b is shown as attached to base wire 16 alternatively within the connection to anchor nob 24. Further, devices 40c are shown as attached to both ends of conducting wires 18 before the pole connection and before entry into the riser pipe.

Figure 2:
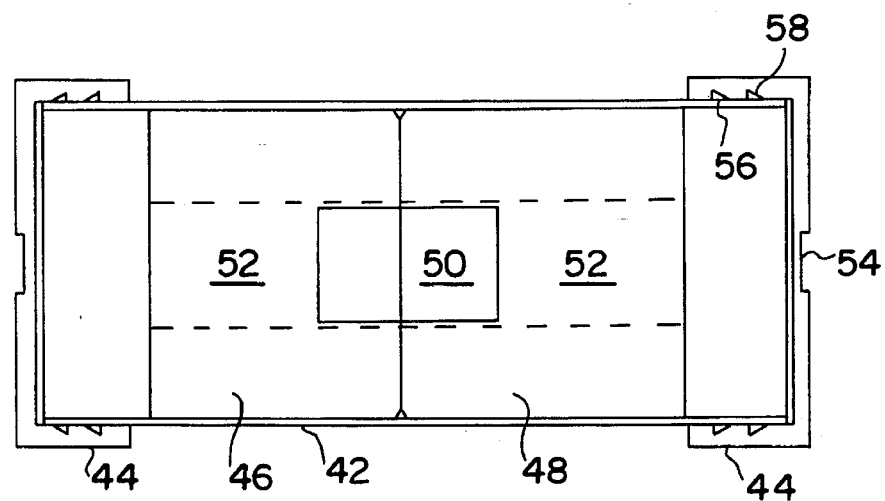
FIG. 2 shows a cross sectional view of a breakaway connection device according to the principles of the present invention.

These devices 40 are illustrated in more detail in FIG. 2. Preferably, each such device 40 includes an insulating sheath 42 having endcaps 44 and surrounding two adjacent, hollow wire receptacles 46 and 48. These receptacles are formed from electrically conductive material and are joined by an electrically conductive solid insert 50. In especially preferred embodiments, receptacles 46 and 48 and insert 50 are formed from aluminum, copper, or a bimetal alloy. Insert 50 may advantageously be formed as a solid rod dimensioned to closely fit into recesses 52 of receptacles 46 and 48 so as to close off one end of each receptacle. Further, endcaps 44 are preferably formed with frangible portions 54 aligned with recesses 52. Endcaps 44 may, for example, be retained onto sheath 42 by ferrule-like ribs 56 disposed about the circumference of the sheath and receivable within mating recesses 58 on the interior surface of each endcap.

By way of example, devices 40 can be formed from materials similar to those used in LINKET™ or INSULINK™ products made by FCI Co. (d/b/a Burndy) of Norwalk, Conn. In contrast with such products, the present invention permits the internal crimped element to separate into electrically isolated components upon the application of excessive force.

In operation, the ends of each wire of service cable 12 are inserted into hollow wire receptacle 46 through frangible portions 54 and the corresponding ends of the wires to be connected to service cable 12 are similarly inserted into hollow wire receptacle 48. Each wire end is crimped into its receptacle after that insertion. Preferably, the receptacles are themselves crimped together previously and in such a manner that a predetermined force must be applied to separate the receptacles, or alternatively, the wires from the receptacles. Various conventional crimping means are available for this purpose.

By way of example, the ends of base wire 16 can be crimped into the receptacles of device 40a such that breakaway separation occurs upon the application of 400 pounds of force to the wire. At the same time the breakaway force required for devices 40c, for the current carrying wires, can be set at 150 pounds. In such an application it is contemplated that the force required to cause anchor nob 24 to pull away from or permit damage to structure 10 would be in excess of 400 pounds. Further, it is expected that in the usual case it will be more desirable to have service cable 12 disconnect from pole 14 such that the exposure to current carrying or energized wire ends are at a significant elevation above normal traffic. Thus, it is also contemplated that the breakaway force required for device 40b would be greater than 400 pounds in this example, although still preferably less than the force required to cause damage to structure 10.

When application of the breakaway force causes the receptacles of devices 40c to separate, the electrical connection is broken. Since device 40a is preferably set to breakaway at a much higher force than would be required to cause breakaway in devices 40c, when base wire 16 is separated from pole 14 the current carrying wires will also separate.

In alternative embodiments, receptacles 46 and 48 can be threaded and joined by a bolt-like rod instead of crimped insert 50. For example, a number 2 stranded INSULINK product can be cut in half and one end of each piece threaded using a ⅛ inch NPT 27 tap. A stud bolt can then be inserted to join each end. In such a case the breakaway tension was observed to be 60 pounds of force.

As a result of the present invention, both property damage to the utility equipment and the power receiving structure can be localized and minimized. Since separation of the service cable occurs at a predetermined low force, ancillary equipment is not damaged and repair and reconnection is streamlined. Further, separating the service cable at an elevation minimizes the electrical hazard.

Although preferred embodiments of the present invention have been described above in detail, the same is by way of illustration and example only, and not as a limitation. Those of skill in this art will now readily appreciate that various adaptions can be made within the spirit of this invention. Accordingly, the spirit and scope of the present invention are only limited by the scope of the claims below.

What is claimed is:

1. A method of electric service cable connection wherein said service cable includes a plurality of electrically conducting wires, at least one of which serves as a load supporting wire for other electrically conducting wires, and wherein said service cable is to be connected at an elevated altitude between two structures, each of said structures having a bracket means attached thereto for receiving said service cable and having electrically conductive wiring for connection with the electrically conducting wires of said service cable, one of said structures being a source of electric power to the other of said structures, said bracket means being separable from said structures upon the application thereto of at least a first separation force, said method comprising:

connecting each end of said load supporting wire to a breakaway connection device between said service cable and each of said bracket means, each of said breakaway connection devices having a pair of receptacle elements separably joined by an insert element, one of said receptacle elements having means for receiving and retaining therein an end of said load supporting wire, another of said receptacle elements having means for connection to said bracket means, and said insert being attached to both of said receptacle elements until a first predetermined separation force is applied to said breakaway connection device, adapting the insert of the breakaway connection device between said load supporting wire and said structure serving as the source of electric power to separate from at least one of its corresponding receptacle elements upon the application thereto of a second separation force, adapting the insert of the breakaway connection device between said load supporting wire and the other of said structures to separate from at least one of its corresponding receptacle elements upon the application thereto of a third separation force, and said second separation force being selected to be less than said third separation force and said third separation force being selected to be less than said first separation force.

2. The method according to claim 1 wherein ends of each of said electrically conductive wires of said service cable are connected to second breakaway connection devices between the electrically conductive wire ends and the wiring for connection therewith and inserts of said second breakaway connection devices are adapted to separate from at least one of their corresponding receptacles upon the application thereto of a fourth separation force, that fourth separation force being less than said second separation force.

3. A method of electric service cable connection wherein said service cable includes at least first and second pairs of wires to be connected between two structures, comprising:

connecting said first pair of wires together through a first breakaway connection means for separably joining pairs of wires, connecting said second pair of wires together through a second breakaway connection means for separably joining pairs of wires, adapting the first breakaway connection means to disconnect the first pair of wires in response to a first separation force being applied to those wires, adapting the second breakaway connection means to disconnect the second pair of wires in response to a second separation force being applied to those wires, and said first separation force being different from said second separation force.

\* \* \* \* \*